United States Patent
Fritz et al.

(10) Patent No.: US 12,337,430 B2
(45) Date of Patent: Jun. 24, 2025

(54) HIGH PRECISION MACHINE TOOL HAVING LINEAR DRIVE- AND GUIDE BEARING

(71) Applicant: Kern Microtechnik GmbH, Eschenlohe (DE)

(72) Inventors: Matthias Fritz, Eschenlohe (DE); Christian Maier, Grossweil (DE)

(73) Assignee: Kern Microtechnik GmbH, Eschenlohe (DE)

( * ) Notice: Subject to any disclaimer, the term of this patent is extended or adjusted under 35 U.S.C. 154(b) by 756 days.

(21) Appl. No.: 17/753,120

(22) PCT Filed: Aug. 21, 2020

(86) PCT No.: PCT/DE2020/000191
§ 371 (c)(1),
(2) Date: Sep. 23, 2022

(87) PCT Pub. No.: WO2021/037295
PCT Pub. Date: Mar. 4, 2021

(65) Prior Publication Data
US 2023/0018583 A1    Jan. 19, 2023

(30) Foreign Application Priority Data
Aug. 23, 2019 (DE) ............ 10 2019 005 966.2

(51) Int. Cl.
*H02K 7/08* (2006.01)
*B23Q 1/25* (2006.01)
(Continued)

(52) U.S. Cl.
CPC ............ *B23Q 1/38* (2013.01); *B23Q 1/25* (2013.01); *F16C 29/025* (2013.01);
(Continued)

(58) Field of Classification Search
CPC ...... H02K 7/08; H02K 41/02; F16C 32/0402; F16C 32/0472; B23Q 1/25; B23Q 1/38
See application file for complete search history.

(56) References Cited

U.S. PATENT DOCUMENTS

2003/0036336 A1*  2/2003  Wakazono ............... B23Q 1/58
                                                                    451/11

FOREIGN PATENT DOCUMENTS

DE     69106165 T2   5/1995
DE     29706669 U1   8/1998
(Continued)

*Primary Examiner* — Jue Zhang
(74) *Attorney, Agent, or Firm* — Colson Law Group, PLLC (57) ABSTRACT

A high-precision machine tool with at least one linear drive and guide-bearing, having at least one linear motor, which has at least one magnet arranged on one of the machine components and at least one coil arranged on the other machine component and operatively connected to the at least one magnet, wherein the at least one magnet and the at least one coil are configured to exert an opposing attractive force and to perform an at least temporarily relative movement in relation to one another; at least one hydrostatic fluid bearing arranged on one of the two machine components and operatively connected to the other machine component, wherein the hydrostatic fluid bearing exerts a repulsive force opposite to the attractive force; and a first bearing gap, formed between the two machine components, the height of which is greater than 0 μm and less than or equal to 10 μm.

5 Claims, 4 Drawing Sheets

(51) Int. Cl.
  *B23Q 1/38*  (2006.01)
  *F16C 29/02* (2006.01)
  *F16C 32/04* (2006.01)
  *H02K 41/02* (2006.01)
(52) U.S. Cl.
  CPC ...... *F16C 32/0402* (2013.01); *F16C 32/0472* (2013.01); *H02K 7/08* (2013.01); *H02K 41/02* (2013.01)

(56) References Cited

FOREIGN PATENT DOCUMENTS

| | | | |
|---|---|---|---|
| DE | 19803952 | A1 | 8/1999 |
| EP | 0647788 | A1 | 4/1995 |
| EP | 1116549 | A2 | 7/2001 |

\* cited by examiner

HIGH PRECISION MACHINE TOOL HAVING LINEAR DRIVE- AND GUIDE BEARING

The present invention relates to a high-precision machine tool having at least one linear drive means according to the preamble of claim 1.

High-precision machine tools with linear drive means for performing a movement relative to one another of two machine components located in the high-precision machine tool are known in principle. They serve to set the two machine components reliably and precisely in motion, to guide them, and to keep them at a standstill. Thus, the applicant of this patent offers a machining center, which comprises a generic high-precision machine tool and with which two machine components can be moved relative to one another at a distance of 20 μm or more, under the registered German trademark KERN Pyramid Nano (official registration number 30676385).

The aim of the present invention is to specify a high-precision machine tool by means of which two machine components can be positioned relative to one another and moved linearly with even greater precision in comparison to the prior art.

The aim is achieved according to the invention with the features of claim 1. Further embodiments of the invention emerge from the dependent claims.

The high-precision machine tool according to the invention can in particular be designed as a machining high-precision machine tool—in particular, as a high-precision milling machine. Furthermore, it can be a single machine, a part of a machining center, a part of a flexible manufacturing cell, or a part of a flexible manufacturing system. It is thus in particular possible to provide the high-precision machine tool with a tool cabinet, including tool changers, and/or with a workpiece changer.

The at least one linear drive means of the high-precision machine tool according to the invention for performing a relative linear movement of two machine components located on the high-precision machine tool is designed as a linear drive- and guide-bearing.

To be understood as machine components are adjacent components of the high-precision machine tool, the movement relative to one another and/or temporary standstill of which is necessary or useful for machining a workpiece. Thus, individual, several, or all pairings of two machine components below can be provided with a linear drive- and guide-bearing:

One of the machine components can be designed as a machine stand of the high-precision machine tool, the other machine component can be designed as a cross slide of the high-precision machine tool adjacent thereto.

One of the machine components can be designed as a machine stand of the high-precision machine tool, the other machine component can be designed as a longitudinal slide of the high-precision machine tool adjacent thereto.

One of the machine components can be designed as a machine stand of the high-precision machine tool, the other machine component can be designed as a vertical slide of the high-precision machine tool adjacent thereto.

One of the machine components can be designed as a longitudinal slide of the high-precision machine tool, the other machine component can be designed as a cross slide of the high-precision machine tool adjacent thereto.

One of the machine components can be designed as a vertical slide of the high-precision machine tool, the other machine component can be designed as a cross slide of the high-precision machine tool adjacent thereto.

One of the machine components can be designed as a vertical slide of the high-precision machine tool, the other machine component can be designed as a longitudinal slide of the high-precision machine tool adjacent thereto.

Consequently, a high-precision machine tool according to the invention can have, in particular, a first linear drive- and guide-bearing for performing a relative linear movement between a machine stand and a cross slide, a further linear drive- and guide-bearing for performing a relative linear movement between the cross slide and a longitudinal slide, and a third linear drive- and guide-bearing for performing a relative linear movement between the longitudinal slide and a vertical slide.

Alternatively, a high-precision machine tool according to the invention may in particular have a first linear drive- and guide-bearing for performing a relative linear movement between a machine stand and a longitudinal slide, a further linear drive- and guide-bearing for performing a relative linear movement between a cross slide and the longitudinal slide, and a third linear drive- and guide-bearing for performing a relative linear movement between the longitudinal slide and a vertical slide.

Each of said machine components can be manufactured from an aluminum alloy. Alternatively, a machine component designed as a machine stand can be manufactured from an ultra-high performance concrete (UHPC).

Furthermore, at least one of the machine components can be of thermosymmetrical design.

The linear drive- and guide-bearing provided according to the invention for performing a relative linear movement of two machine components has at least one linear motor, which has at least one magnet arranged on one of the machine components and at least one coil arranged on the other machine component. In principle, the coil can be designed without a core. Advantageously, however, the coil comprises a core—in particular, a core formed with a ferrite—whereby a comparatively simple structure and a particularly good technical effect of the coil can be achieved. The magnet—preferably a permanent magnet—and the coil are operatively connected to one another and are configured in such a way that they can exert an opposing attractive force and perform an at least temporarily relative movement in relation to one another.

Furthermore, the linear drive- and guide-bearing provided according to the invention has, for performing a relative linear movement of two machine components, at least one hydrostatic fluid bearing arranged on one of the two machine components and operatively connected to the other machine component. This fluid bearing is configured in such a way that it exerts a repulsive force that is opposite to the attractive force, so that a first bearing gap can be formed between the two machine components. It is understood that the attractive force and the repulsive force have the same magnitude if a first bearing gap of constant height is to be set between the two machine components arranged so as to move in relation to one another. The acceleration, velocity, and position of a machine component in a feed direction can in principle be adjusted by controlling or regulating the current flowing through the aforementioned coil. The acceleration, velocity, and position of the machine component transverse to the feed direction can in principle be adjusted by controlling or regulating the flow rate of the hydraulic current, and thus the flow rate of the fluid, through the hydrostatic fluid bearing. Controlling or regulating the height of the bearing gap, the acceleration, the velocity, and/or the relative movement direction of the two machine components may alternatively or cumulatively take place in a simple manner by suitable adaptation of the electrical current flowing through the coil and not least matched to the magnet.

Finally, the height of the first bearing gap of the linear drive- and guide-bearing provided according to the invention for performing a relative linear movement of two machine components is more than 0 µm and substantially 10 µm or less. In other words, if the height of the first bearing gap is denoted by H1, the following relationship substantially applies:

$$0\ \mu m < H1 \leq 10\ \mu m$$

As a result of the design of the linear motor proposed here in the manner of a synchronous linear motor and as a result of its operative connection to at least one hydrostatic fluid bearing, a linear drive- and guide-bearing with a high degree of efficiency and at the same time good thermal economy is, advantageously, created, which in addition has very high precision. The relative movement of the two machine components can take place in such a way that one of the two machine components moves while the other machine component does not move, or that both machine components move simultaneously. In other words, it is, advantageously, provided that the one machine component moves while the other machine component remains in its position, or that the one machine component remains in its position while the other machine component moves in relation thereto, or that both the one machine component and the other machine component move simultaneously in relation to one another.

According to a preferred embodiment, the two machine components of the high-precision machine tool according to the invention each have a first virtual plane parallel to one another, in which the linear motor and the hydrostatic fluid bearing extend, forming the first bearing gap. In this way, an exact and parallel guidance of the two machine components during their relative movement is, advantageously, created.

In principle, a second virtual plane inclined to the first virtual plane can be provided, in which at least one linear guide means is formed. The corresponding angle of inclination can have any suitable magnitude—in particular 15°, 30°, or 45°. In a particularly advantageous manner, a second virtual plane which is orthogonal to the respective first virtual plane and in which the at least one linear guide means is formed can be provided. Consequently, the angle of inclination is 90°, as a result of which the degrees of freedom of the two machine components are, advantageously, blocked.

According to a preferred embodiment of the high-precision machine tool according to the invention, said linear guide means has at least one fluid bearing means and a magnetic bearing means counteracting said fluid bearing means. This advantageously creates a mounting of the linear drive- and guide-bearing according to the invention that is easy to produce and adjustable during operation, so that the two machine components can be guided precisely and easily in two spatial planes oriented orthogonally to one another. It is understood that the opposing forces acting on the machine component or the machine components by means of the fluid bearing means and the magnetic bearing means have the same magnitude in order to keep the linear guide means in equilibrium.

A particularly simple structure of a linear drive- and guide-bearing according to the invention, and thus of the high-precision machine tool according to the invention, is created when the fluid bearing means and the magnetic bearing means are arranged on one and the same machine component and are operatively connected to the other machine component.

According to a further, preferred embodiment, the linear drive- and guide-bearing provided according to the invention, when viewed in cross-section, has the structure disclosed below. It should be noted that the cross-section corresponds to a virtual cut surface through the device according to the invention, said cut surface being oriented orthogonally to both the first virtual plane and the second virtual plane. Consequently, one of the machine components has a first bearing surface, a second bearing surface spaced apart therefrom, and a first receiving region located between them. In contrast, the other machine component has a first receiving section, a second receiving section spaced apart therefrom, and a second receiving region located between them. At least a first hydrostatic fluid bearing opposite the first bearing surface is received in the first receiving section, a second hydrostatic fluid bearing opposite the second bearing surface is received in the second receiving section, the at least one magnet is received in the first receiving region, and the at least one coil is received in the second receiving region, wherein the magnet and the coil are opposite one another. This advantageously creates a particularly precise and comparatively easy-to-produce linear drive- and guide-bearing.

The first receiving region can be designed to be recessed in relation to the first bearing surface and/or the second bearing surface. This advantageously creates a channel in which fluid exiting from the hydrostatic fluid bearing—in particular, oil—can collect. By means of a suitable design of the channel surface and/or an optional discharge, said fluid can be easily removed from the magnet.

For the purpose of a particularly simple structure of the linear drive- and guide-bearing provided according to the invention and its improved guidance precision, the machine component having the first receiving section and the second receiving section has a first projecting section and a second projecting section opposite the first projecting section. The fluid bearing means is arranged in the first projecting section. The magnetic bearing means is arranged in the second projecting section, wherein the two projecting sections are adjacent to the other machine component, forming a second bearing gap.

Advantageously, a particularly easy-to-produce linear drive- and guide-bearing is created when the magnetic bearing means has a magnetic strip located on the one machine component and a mating strip—preferably a ferromagnetic mating strip—located on the other machine component, which are configured to exert a repulsive force on one another. However, it is understood that, alternatively or cumulatively, at least one variable or non-variable electromagnetic means may be provided in order to adjust the required repulsive force.

According to a preferred embodiment, the fluid means corresponds to one of the hydrostatic fluid bearings provided. In other words, the structure of a fluid means can correspond to that of a hydrostatic fluid bearing, as a result of which the manufacturing costs of the device according to the invention can, advantageously, be reduced in the sense of a uniform parts strategy. It is understood that all fluid means and hydrostatic fluid bearings located in the linear drive- and guide-bearing provided according to the invention may also have an identical structure, as a result of which the aforementioned advantage is multiplied.

The linear drive- and guide-bearing provided according to the invention is furthermore characterized by an operative connection to at least one temperature control means. As a result, it is possible to control the temperature of a single part, several parts, or all of the previously disclosed parts of the high-precision machine tool according to the invention, and in particular of the linear drive- and guide-bearing—in particular, to cool it or them—in such a way that its or their temperature-related deformations can be compensated for or reduced to an acceptable degree. Thus, lines conducting temperature control fluid can, advantageously, be provided in one or both machine components, on the linear motor—in particular, on or in the region of the coil and/or of the magnet—in the region of the hydrostatic fluid bearing, and/or in the region of the fluid bearing means. Furthermore, it is, advantageously, possible to arrange at least one temperature measuring means at least one of the previously disclosed locations.

The temperature control means can in principle be located in the high-precision machine tool itself. According to a particularly preferred embodiment, the temperature control means is positioned at a distance from the latter, so that the units required for temperature control—in particular, their compressor(s) and pump(s) for the temperature control fluid—are arranged to be vibration-isolated from the first or second machine component in order to further increase the accuracy of the high-precision machine tool.

Further features and advantages according to the invention are illustrated in the appended, non-limiting exemplary embodiments of the present invention, with reference to the appended, not-to-scale drawing. Here.

Figure 1:
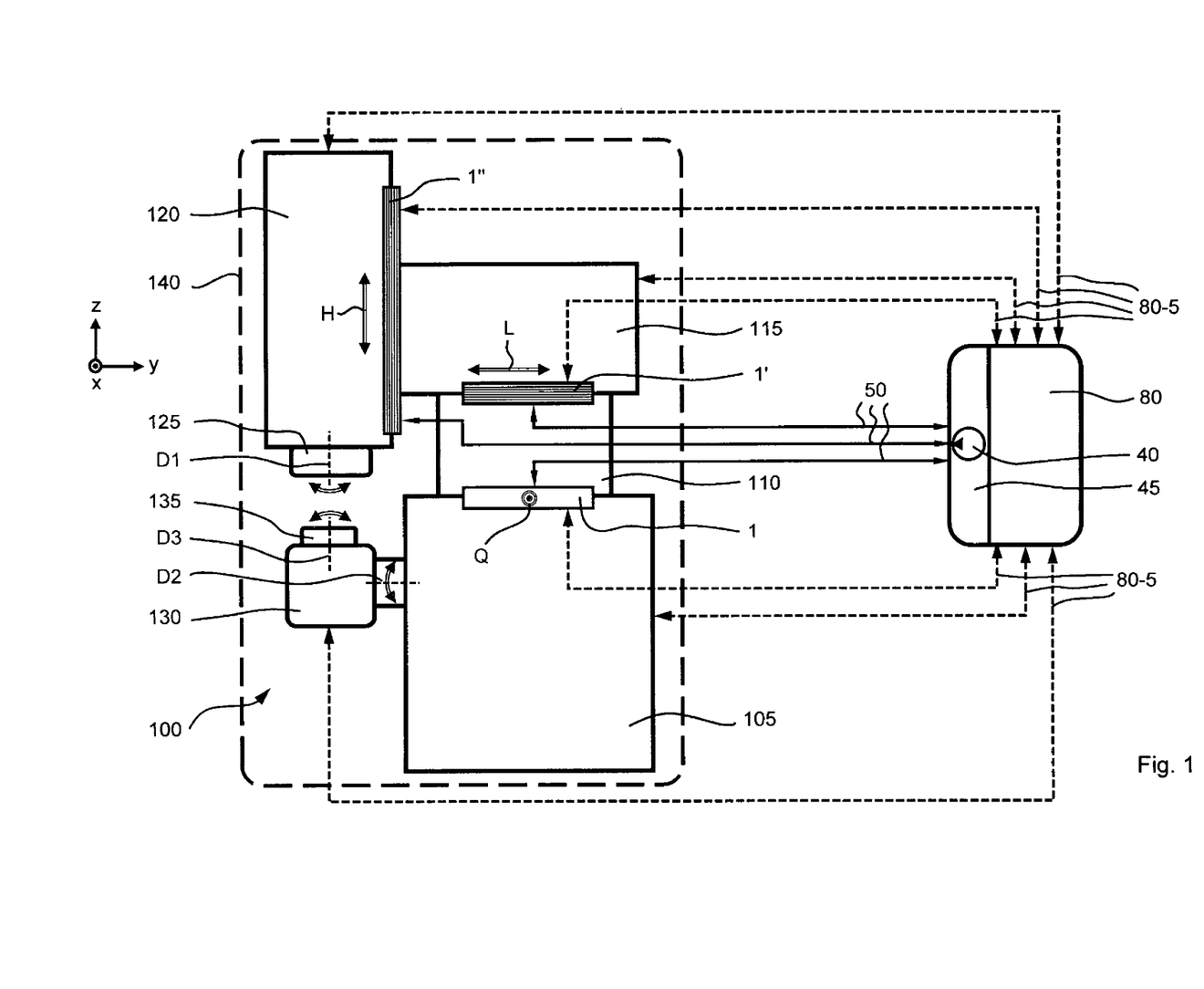
FIG. 1 is a symbolic and simplified side view of a high-precision machine tool according to the invention.

FIG. 1 is a symbolic and simplified side view of a high-precision machine tool 100 according to the invention, which is designed in the style of a moving column according to the exemplary embodiment shown here. It comprises a machine stand 105, a cross slide 110 movable in a transverse direction or linear axis Q in relation thereto, a longitudinal slide 115 movable in a longitudinal direction or linear axis L in relation to the cross slide 110, and a vertical slide 120 movable in a vertical direction or linear axis H in relation to the longitudinal slide 115.

According to a convention selected here, the transverse direction Q runs in parallel to an x-axis of a Cartesian coordinate system known per se, and thus out of the paper plane of FIG. 1. According to the convention selected here, the longitudinal direction L runs in parallel to a y-axis of the Cartesian coordinate system, and thus in the horizontal direction of FIG. 1. According to the convention selected here, the vertical direction H runs in parallel to the z-axis of the Cartesian coordinate system, and thus in the vertical direction of FIG. 1. Consequently, the cross slide 110, the longitudinal slide 115, and the vertical slide 120 can be moved in directions orthogonal to one another.

Located at the end, facing the machine stand 105, of the vertical slide 120 is a tool carrier means 125 on which a tool (not shown here), e.g., a milling cutter, can be received and can be mounted so as to rotate about an axis of rotation D1 running in parallel to the z-axis. In turn, a workpiece carrier means 130 is mounted on the machine stand 105 so as to pivot about an axis of rotation D2 running in parallel to the y-axis. Located at the end, opposite the tool carrier means 125, of the workpiece carrier means 130 is a workpiece receptacle 135 in which a workpiece (not shown here) to be machined can be received so as to pivot about an axis of rotation D3.

Consequently, the high-precision machine tool 100 of this exemplary embodiment is designed as a 5-axis, high-precision machine tool, which is additionally located in an enclosure 140, which may in particular be designed in the manner of a cabinet.

For the purpose of performing a linear movement of the cross slide 110 in relation to the machine stand 105, a linear drive- and guide-bearing 1 is provided on the latter. For the purpose of performing a linear movement of the longitudinal slide 115 in relation to the cross slide 110, a further linear drive- and guide-bearing 1' is provided on the latter. Finally, according to this exemplary embodiment, a last linear drive- and guide-bearing 1" is provided on the longitudinal slide 115 and the vertical slide 120.

Figure 2:
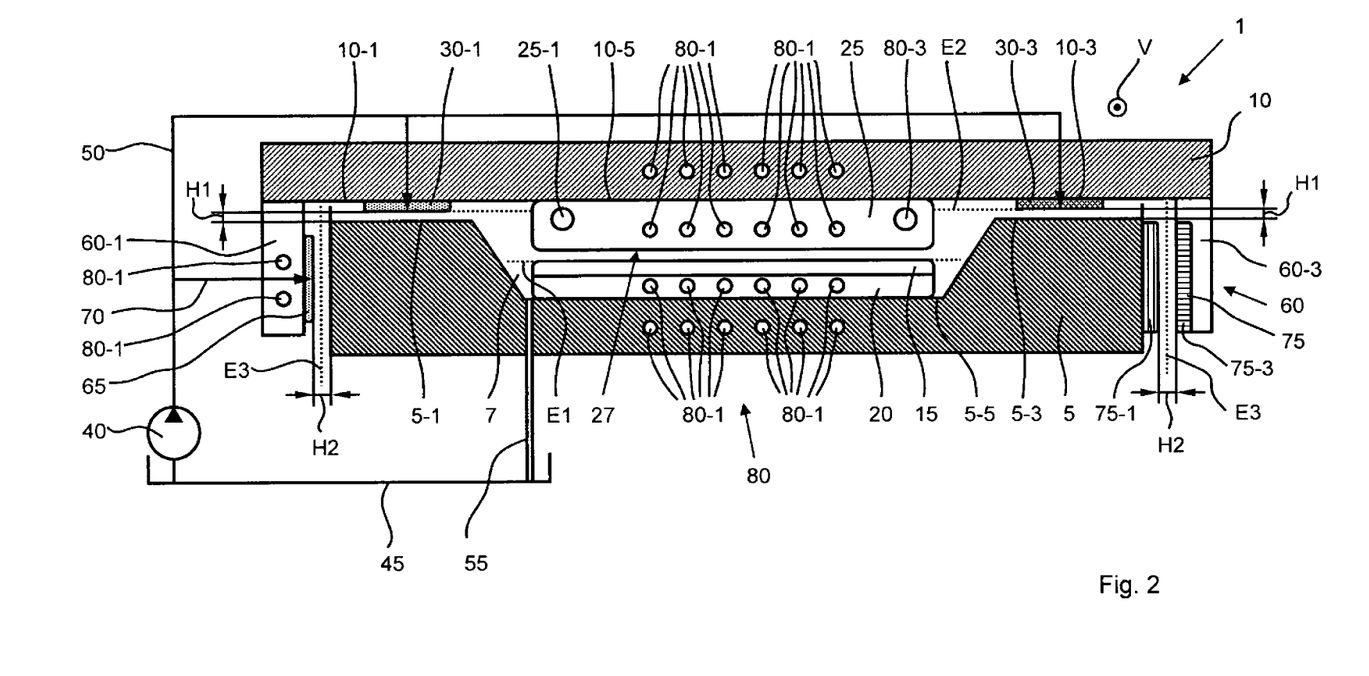
FIG. 2 is a symbolic and simplified cross-sectional view through a linear drive- and guide-bearing provided according to the invention.
Figure 3:
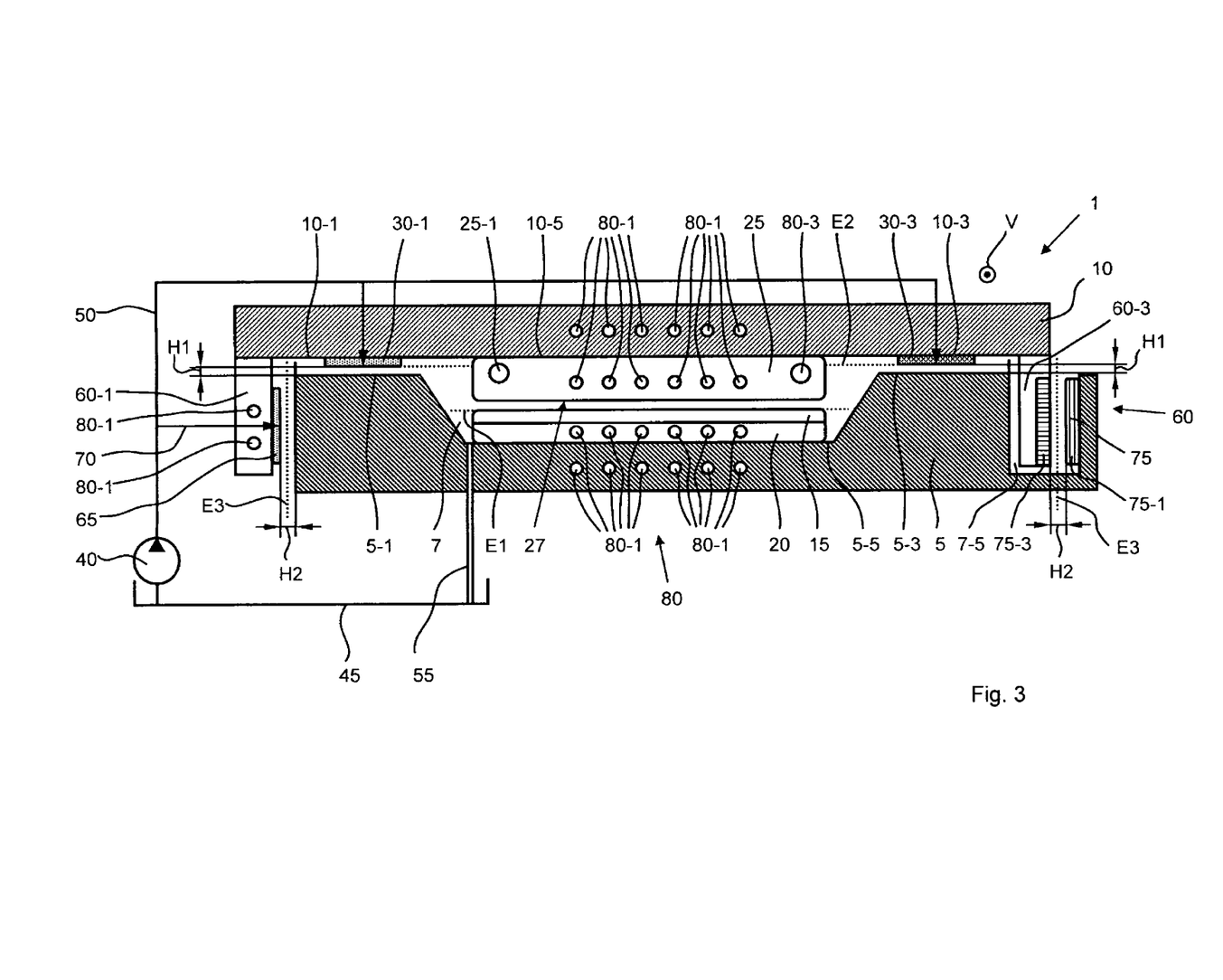
FIG. 3 is an alternative embodiment to the embodiment shown in FIG. 2.
Figure 4:
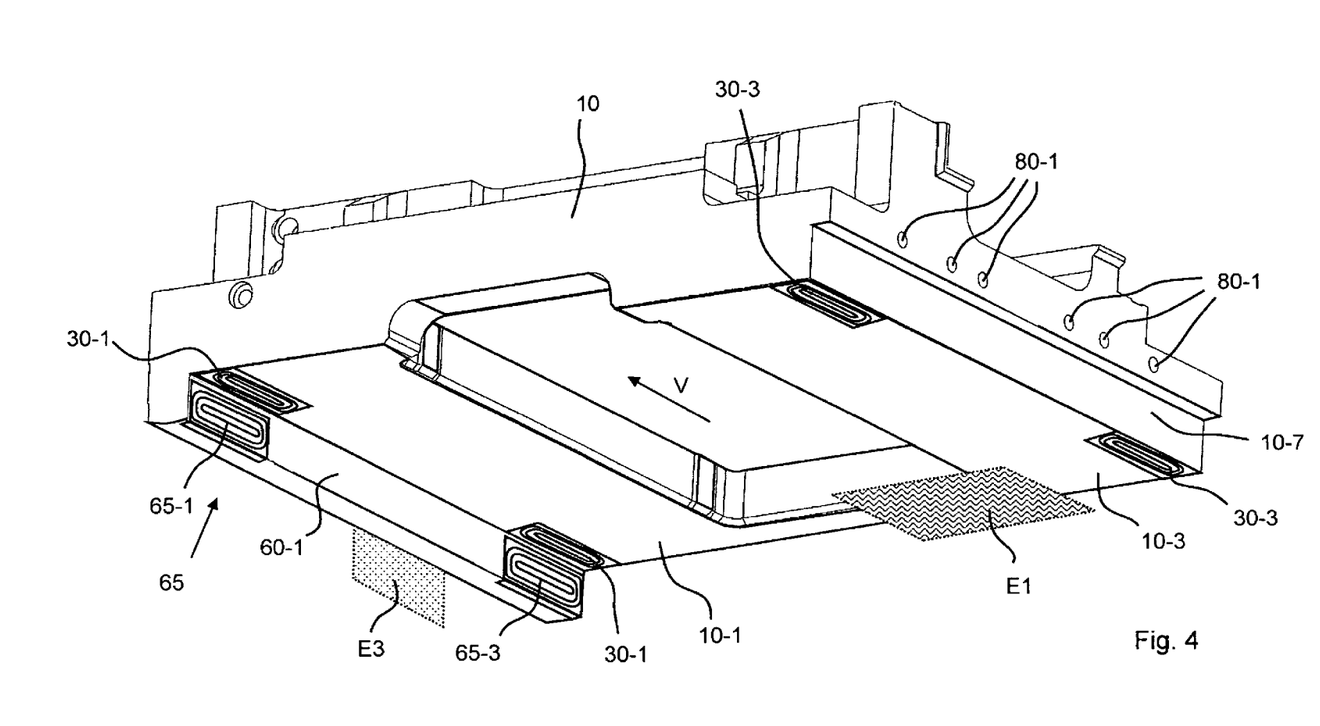
FIG. 4 is a simplified, perspective, bottom view of an alternative machine component to the machine component shown in FIG. 2.

The structure and the mode of operation of the linear drive- and guide-bearings 1, 1', and 1" are explained further with reference to FIGS. 2 through 4. It should already be pointed out at this juncture that the drive- and guide-bearings 1, 1', and 1" are designed as hydrostatic fluid bearings which are supplied with a fluid (not shown here) via a pump 40 and fluid lines 50.

As can be seen in FIG. 1, the pump 40 and a reservoir 45 containing the mentioned fluid are located outside the enclosure 140. Also located outside the enclosure 140 and, according to this exemplary embodiment, adjacent to the pump 40 and the reservoir 45 is a temperature control means 80, by means of which a cooling fluid (not shown here) can be dispensed, depending upon the temperature situation, via cooling lines 80-5 to individual or all parts or components located in the enclosure 140. In detail, according to the exemplary embodiment shown here, the machine stand 105, the cross slide 110, the longitudinal slide 115, the vertical slide 120, the tool carrier means 125, the workpiece carrier means 130, and the linear drive- and guide-bearings 1, 1', and 1" are fluidically connected to the temperature control means 80. In addition, the enclosure 140 itself can also be fluidically connected to the temperature control means 80.

In FIGS. 2 through 4, a linear drive- and guide-bearing 1 is shown in more detail by way of example. Due to the fact that the latter corresponds, according to the exemplary embodiment shown here, in its structure and function to the linear drive- and guide-bearings 1' or 1", the general focus below, for reasons of a simpler illustration of the conditions, is a movement of two machine components 5 or 10, wherein the following relationship applies:

The linear drive- and guide-bearing 1 serves to reliably and precisely move the cross slide 110, which is referred to below as machine component 10, in relation to the machine stand 105, which is referred to below as machine component 5. Accordingly, the linear drive- and guide-bearing 1' serves to reliably and precisely move the longitudinal slide 115, which can be regarded as machine component 10, in relation to the cross slide 110, which can be regarded as machine component 5. Finally, the linear drive- and guide-bearing 1" serves in this sense to reliably and precisely move the vertical slide 120, which can be regarded as machine component 10, in relation to the longitudinal slide 115, which can be regarded as machine component 5.

As can be seen in FIG. 2, the lower machine component 5 has a first bearing surface 5-1, a second bearing surface 5-3 spaced apart therefrom, and a first receiving region 5-5 located between them. Said receiving region is designed to be recessed in relation to the two bearing surfaces 5-1 and 5-3 and forms a channel 7, the function of which is explained later.

In contrast, the upper machine component 10 in FIG. 2 is designed to be flat on the side facing the machine component 5 and has a first receiving section 10-1, a second receiving section 10-3 spaced apart therefrom, and a second receiving region 10-5 located between them. The first receiving section 10-1 is located opposite the first bearing surface 5-1, the second receiving section 10-3 is located opposite the second bearing section 5-3, and the second receiving region 10-5 is located opposite the first receiving region 5-5.

The linear drive- and guide-bearing 1 comprises a magnet 15, which, according to this exemplary embodiment, is designed as a substantially flat, permanent magnet and is placed in the first receiving region 5-5 by means of a carrier 20. Located on the upper machine component 10 in FIG. 2 and opposite the magnet 15 is a coil 25, which has a ferrite core (not shown here) and is connected via an electrical connection 25-1 to an electronic system (not shown here). The magnet 15 and the coil 25 attract the two machine components 5, 10 in a permanently-magnetic manner. Furthermore, by means of the electronic system, the coil 25 can be brought into operative connection with the magnet 15 in order to form a linear motor 27 together therewith.

In order to avoid a magnetic-force-induced collision of the two machine components 5, 10, a first hydrostatic fluid bearing 30-1 is arranged on the first receiving section 10-1, and a second hydrostatic fluid bearing 30-3 is arranged on the second receiving section 10-3, said second hydrostatic fluid bearings exerting a hydrostatic pressure on the first bearing surface 5-1 or the second bearing surface 5-3 by means of a fluid (not shown here), said hydrostatic pressure counteracting the aforementioned magnetic attractive force. In this case, the fluid is pumped by means of the pump 40 out of the reservoir 45 through the fluid line 50 via hydraulic series resistors (not shown here) to the two hydrostatic fluid bearings 30-1, 30-3, from which it exits into a chamber (not shown here) which is laterally sealed, but open in the direction of the two receiving regions 5-1 and 5-3. Any leaking fluid (not shown) exiting the chamber is collected in the channel 7 and can be conducted as needed via a leakage line 55 back into the reservoir 45.

As a result of the interaction of the linear motor 27 and the hydrostatic fluid bearings 30-1, 30-3, a first bearing gap H1 can be adjusted between the two machine components 5, 10 in the region of the first receiving section 10-1 and of the second receiving section 10-3, the height of said first bearing gap being 5 μm according to this exemplary embodiment. It is understood that, according to the invention, the height of the first bearing gap H1 may also be less than 5 μm, e.g., 3 μm, or also greater, e.g., 6 μm, 7 μm, 8 μm, 9 μm, or 10 μm.

It is easy to see that this first bearing gap H1, which is very small in comparison to the prior art, cannot be easily adjusted and maintained. It is therefore provided that the two machine components 5, 10 each have a first virtual plane E1 or E2 parallel to one another, in which the linear motor 27 or the hydrostatic fluid bearings 30-1, 30-3 extend. This in particular avoids a collision of the two machine components 5, 10 when the activity of the linear motor 27 causes them to move relative to one another or to stop. The movement itself takes place, with reference to FIG. 2, out of its paper plane or back into it. In other words, the feed axis V of the machine component 10 is oriented orthogonally to the paper plane.

According to the exemplary embodiment shown here, the linear drive- and guide-bearing 1 is designed in such a way that the machine component 10 designed as a cross slide 10 moves in relation to the machine component 5, while the latter remains at a standstill, since it is fixedly mounted on the machine stand 105.

With the previously disclosed means, a guidance of the two machine components 5, 10 in the direction of the feed axis V (thus the transverse direction Q) and in the direction of the first gap H1 is made possible. For the purpose of lateral guidance of the two machine components 5, 10, a first section 60-1 or a second section 60-3 spaced apart therefrom project from the machine component 10 in each case in a second virtual plane E3, orthogonal to the respective first virtual plane E1, E2, in the direction of the machine component 5 in such a way that a second bearing gap H2 is present in each case between them and the machine component 5.

A fluid bearing means 65 designed as a hydrostatic bearing is located on the first section 60-1 shown on the left in FIG. 2 and interacts with the machine component 5, which is opposite thereto and spaced apart as a result of the bearing gap H2. For this purpose, the fluid bearing means 65 is connected by means of a fluid line 70 and via hydraulic series resistors (not shown here) to the fluid line 50 and the pump 40 so that, between the first section 60-1 and the machine component 5, a mechanical force repelling the two from one another is produced. It should be noted that the fluid bearing means 65 may correspond to one of the hydrostatic fluid bearings 30-1, 30-3.

Located in the region of the second section 60-3 shown on the right in FIG. 2 is a magnetic bearing means 75 which is likewise subject to a repulsive force in relation to the machine component 5 in order to produce a second bearing gap H2 between the two. For this purpose, a magnetic strip 75-1 is arranged on the machine component 5, and a ferromagnetic mating strip 75-3 is arranged opposite thereto on the second section 60-3. It is understood that the magnetic bearing means 75 can, alternatively, also be designed as an electromagnetic device.

By means of a suitable output of the pump 40, positioning and geometry or structure of the fluid bearing means 65 in coordination with the magnetic repulsive force of the magnetic bearing means 75, a very precise, second bearing gap H2 can thus be adjusted.

In order to further improve the dimensional accuracy of the linear drive- and guide-bearing 1, a plurality of channels 80-1 through which the cooling fluid (not shown here) flows is provided in the exemplary embodiment shown here, which channels are fluidically connected to the cooling lines 80-5. The channels 80-1 are located in the machine component 10, the coil 25, the carrier 20, the machine component 5, and the first projecting section 60-1 in order to be able to set a uniform temperature distribution via the linear drive- and guide-bearing 1. For the purpose of a temperature measurement, a temperature measuring means 80-3 is accommodated in the coil 25. It is understood that, in particular, the number, positioning, and dimensioning of the channels 80-1 may differ from the exemplary embodiment presented here.

FIG. 3 shows an alternative embodiment of a linear drive- and guide-bearing 1 to that in FIG. 2. The right section of the machine component 5 in FIG. 3 has a recess 5-7, on the right flank of which, in this figure, a magnetic strip 75-1 is arranged. Furthermore, the second section 60-3, having a mating strip 75-3, is at least partially and freely movably located in the recess 5-7. Unlike in the exemplary embodiment shown with reference to FIG. 2, the magnetic strip 75-1 and the mating strip 75-3 are now designed to attract one another. Moreover, the structure of the linear drive- and guide-bearing 1 and its function correspond to those of the embodiment shown in FIG. 1.

An alternative embodiment of a machine component 10 to that in FIG. 2 is shown in FIG. 4 in a perspective bottom view. As can be seen, the machine component 10 and the first projecting section 60-1 are now formed in one piece. The second projecting section 60-3 is not shown in this figure and can be mounted on a fastening section 10-7 located on the machine component 10.

A first hydrostatic fluid bearing 30-1 and a structurally identical, second hydrostatic fluid bearing 30-3 are provided in each case on the underside of the machine component 10 and in the four corner regions thereof. Arranged on the first projecting section 60-1 is a fluid bearing means 65 which consists of two hydrostatic fluid bearings 65-1 and 65-2 which are spaced apart from one another and which, in turn, correspond to the first and second hydrostatic fluid bearings 30-1, 30-2. As can be seen, the hydrostatic fluid bearings 30-1, 30-3, 65-1, and 65-2 extend in the same longitudinal direction, which is identical to the feed axis V or the movement direction of the machine part 10.

Unlike in FIG. 2, the channels 80-1 of the temperature control means 80 according to FIG. 4 are not oriented in the direction of the feed axis V, but transversely thereto, and substantially in parallel to the virtual plane E1.

LIST OF REFERENCE SIGNS 1, 1', 1" Linear drive- and guide-bearing
5 Machine component
5-1 First bearing surface
5-3 Second bearing surface
5-5 First receiving region
5-7 Recess
7 Channel
10 Machine component
10-1 First receiving section
10-3 Second receiving section
10-5 Second receiving region
10-7 Fastening section
15 Magnet
20 Carrier
25 Coil
25-1 Electrical connection
27 Linear motor
30-1 First hydrostatic fluid bearing
30-3 Second hydrostatic fluid bearing
40 Pump
45 Reservoir
50 Fluid line
55 Leakage line
60 Linear guide means
60-1 First section
60-3 Second section
65 Fluid bearing means
65-1 Hydrostatic fluid bearing
65-3 Hydrostatic fluid bearing
70 Fluid line
75 Magnetic bearing means
75-1 Magnetic strip
75-3 Mating strip
80 Temperature control means
80-1 Channels
80-3 Temperature measuring means
80-5 Cooling lines
100 High-precision machine tool
105 Machine stand
110 Cross slide
115 Longitudinal slide
120 Vertical slide
125 Tool carrier means
130 Workpiece carrier means
135 Workpiece receptacle
140 Enclosure
D1, D2, D3 Axes of rotation
E1, E2 First virtual planes
E3 Second virtual plane
H Vertical direction
H1 First bearing gap
H2 Second bearing gap
L Longitudinal direction
Q Transverse direction
V Feed axis
x, y, z Cartesian coordinates

The invention claimed is:

1. A high-precision machine tool with at least one linear drive means for performing a relative linear movement of two machine components located on the high-precision machine tool, the two machine components each having a first virtual plane (E1, E2) parallel to one another, in which at least one linear motor and a hydrostatic fluid bearing (30-1, 30-3) extend, forming a first bearing gap (H1),
wherein a second virtual plane (E3) is inclined, preferably orthogonal, to the respective first virtual plane (E1, E2) and in which at least one linear guide means (60) is formed,
wherein the at least one linear guide means (60) has at least one fluid bearing means (65) and a magnetic bearing means (75) counteracting said at least one fluid bearing means (65),
wherein the at least one fluid bearing means (65) and the magnetic bearing means (75) are arranged on one and the same machine component and are operatively connected to the other machine component,
wherein the machine component has a first receiving section (10-1) and a second receiving section (10-3) has a first projecting section (60-1), in which at least one of the at least one fluid bearing means (65) is arranged, and a second projecting section (60-3), which is opposite the first projecting section (60-1) and in which the magnetic bearing means (75) is arranged, wherein the two projecting sections (60-1, 60-3) are adjacent to the other machine component, forming a second bearing gap (H2),
wherein the magnetic bearing means (75) has a magnetic strip (75-1) located on the one machine component and a mating strip (75-3) located on the other machine component, which is configured to exert a magnetic repulsive force on one another,
wherein the fluid bearing means (65) corresponds to the at least one hydrostatic fluid bearing (30-1, 30-3),
wherein the at least one linear drive means is designed as a linear drive and guide-bearing (1, 1', 1"), comprising:
the at least one linear motor, which has at least one magnet arranged on one of the machine components and at least one coil arranged on the other machine component and operatively connected to the at least one magnet, wherein the at least one magnet and the at least one coil are configured to exert an opposing attractive force and perform an at least temporarily relative movement in relation to one another, the at least one hydrostatic fluid bearing (30-1, 30-3) arranged on one of the two machine components and operatively connected to the other machine component, wherein the hydrostatic fluid bearing (30-1, 30-3) exerts a repulsive force opposite to the attractive force, and the first bearing gap (H1) which is formed between the two machine components and the height of which is greater than 0 µm and less than or equal to 10 µm.

2. The high-precision machine tool according to claim 1, wherein one of the machine components, when viewed in cross-section, has a first bearing surface (5-1), a second bearing surface (5-3) spaced apart therefrom, and a first receiving region (5-5) located between them, and wherein the other machine component has a first receiving section (10-1), a second receiving section (10-3) spaced apart therefrom, and a second receiving region (10-5) located between them, wherein at least one hydrostatic fluid bearing (30-1) opposite the first bearing surface (5-1) is received in the first receiving section (10-1), a second hydrostatic fluid bearing (30-3) opposite the second bearing surface (5-3) is received in the second receiving section (10-3), the at least one magnet is received in the first receiving region (5-5), and the at least one coil opposite the first receiving region (5-5) is received in the second receiving region (10-5).

3. The high-precision machine tool according to claim 2, wherein the first receiving region (5-5) is designed to be recessed in relation to the first bearing surface (5-1) and/or the second bearing surface (5-3).

4. The high-precision machine tool according to claim 1, wherein at least one temperature control means (80) is operatively connected thereto.

5. The high-precision machine tool according to claim 4, wherein the at least one temperature control means is positioned in the high-precision machine tool itself or spaced apart therefrom.

* * * * *